3 Sheets--Sheet 1.

J. F. RICHARDS.

Improvement in Machines for Making Eyelets.

Figure 1:
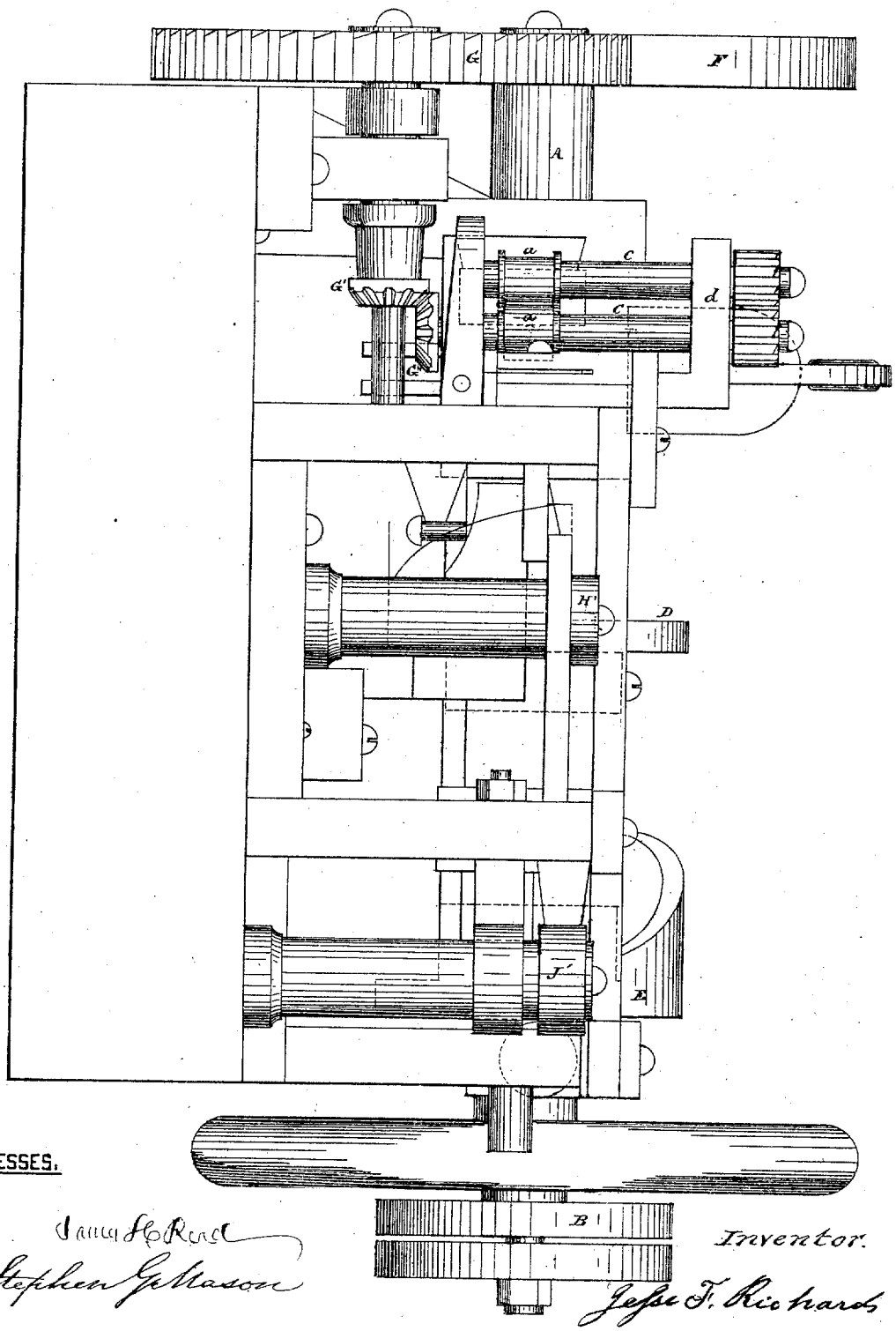

No. 5,136. *Fig. 1.* Reissued Nov. 5, 1872.

WITNESSES.

James H. Reed

Stephen G. Mason

Inventor.

Jesse F. Richards

AM. PHOTO-LITHOGRAPHIC CO. N.Y. (OSBORNE'S PROCESS.)

3 Sheets--Sheet 2.

J. F. RICHARDS.

Improvement in Machines for Making Eyelets.

No. 5,136. Reissued Nov. 5, 1872.

WITNESSES.

James H. Reed

Stephen G. Mason

INVENTOR.

Jesse F. Richards

AM. PHOTO-LITHOGRAPHIC CO. N.Y. (OSBORNE'S PROCESS.)

J. F. RICHARDS.

Improvement in Machines for Making Eyelets.

No. 5,136. Reissued Nov. 5, 1872.

VERTICAL THROUGH CAM "C"

PARTIAL SECTION ON LINE "AB"

James F. Richards
Inventor

James E. Reed
Stephen G. Mason
WITNESSES.

AM. PHOTO-LITHOGRAPHIC CO. N.Y. (OSBORNE'S PROCESS.)

UNITED STATES PATENT OFFICE.

JESSE F. RICHARDS, OF ATTLEBOROUGH, MASSACHUSETTS, ASSIGNOR, BY MESNE ASSIGNMENTS, TO AMERICAN EYELET COMPANY.

IMPROVEMENT IN MACHINES FOR MAKING EYELETS.

Specification forming part of Letters Patent No. 44,555, dated October 4, 1864; reissue No. 5,136, dated November 5, 1872.

*To all whom it may concern:*

Be it known that I, JESSE F. RICHARDS, of Attleborough, in Massachusetts, formerly of Providence, Rhode Island, have invented a new and useful Improvement in Machines for Making Eyelets; and I do hereby declare that the following specification, taken in connection with the drawing making a part of the same, is a full, clear, and exact description thereof.

Figure 2:
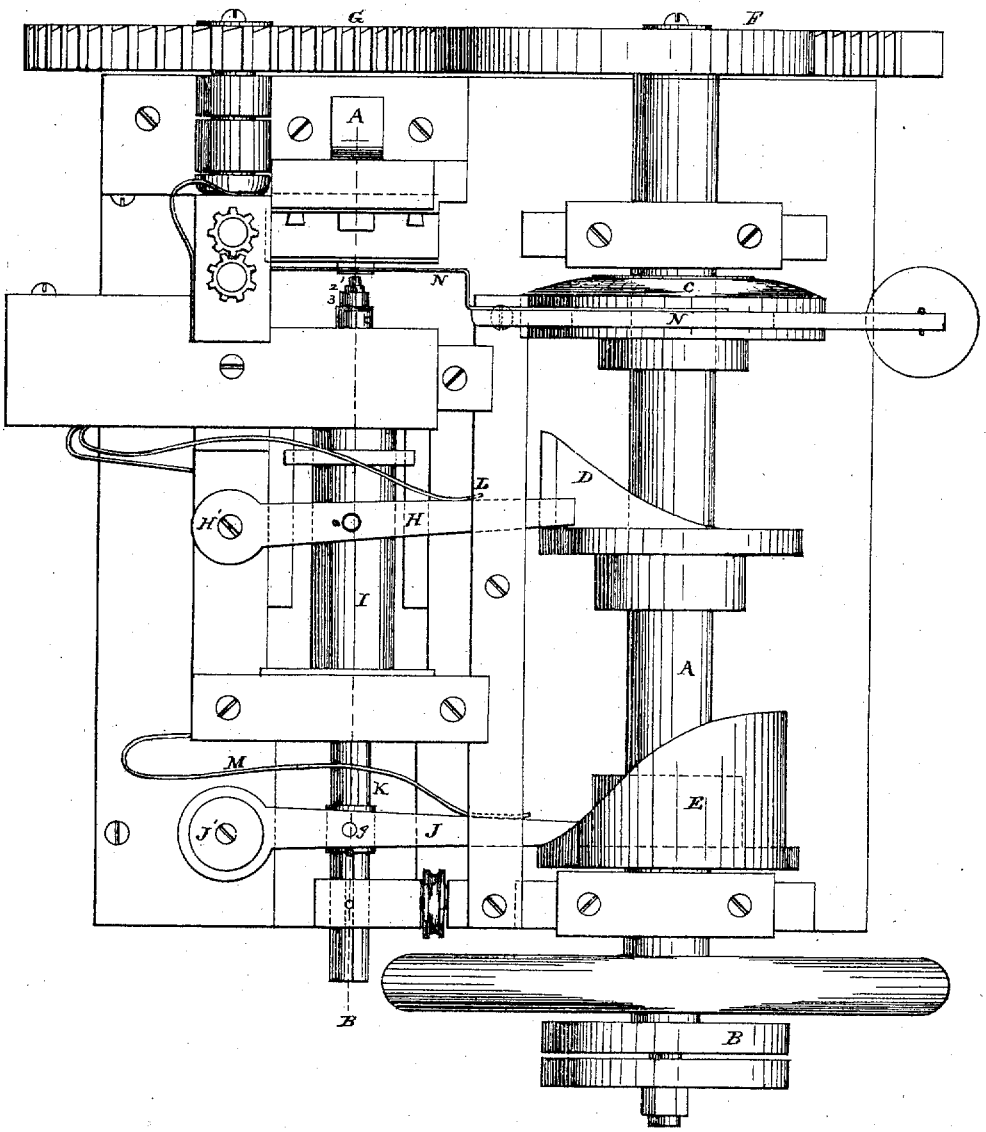
Figure 3:
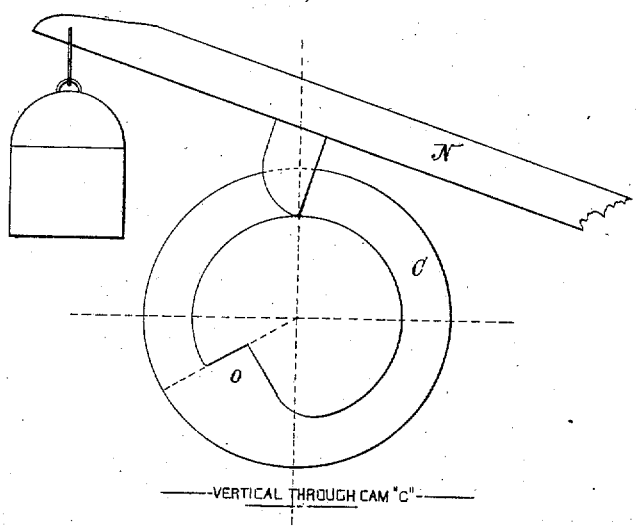
Figure 4:
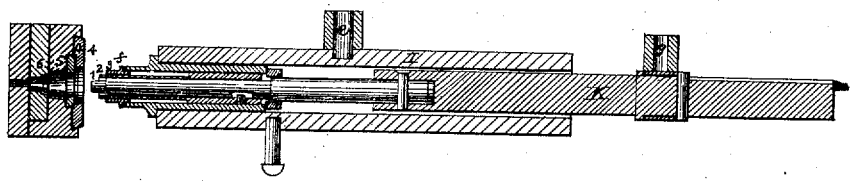

Figure 1 is a front elevation. Fig. 2 is a plan of the machine. Fig. 3 is a vertical section through the cam C. Fig. 4 is a partial section through the line A B, showing the die and the "former" which shapes the eyelets out of a circular planchet of metal.

In the accompanying drawing, A is the main shaft, to which motion is communicated by means of a belt passing over the driving-pulley B. Upon this shaft are mounted the two principal cams D E, from which the motions hereinafter mentioned for forming the eyelet are derived. The stock is fed to the machine in the form of a thin strip or ribbon of sufficient width to allow a planchet to be cut from it. The strip of metal passes between the pressure feed-rollers *a a* and is fed forward at the proper moment by the rollers, which are put in motion for a limited time during each revolution of the main shaft by the wheel F, upon whose periphery there are only so many teeth as, with reference to the number of teeth in the gear-wheel G and beveled wheels $G^1$ $G^2$, carry forward the strip the requisite distance to allow the cutting out of the successive planchets. As these pressure feeding-rollers *a a* are subjected to a considerable strain I prefer to give increased strength to this part of the machine by extending the shafts *c c*, upon which they are mounted, through a cross-frame, *d*, which forms for them upper bearing-journals, and also to provide the upper end of each above the bearing with toothed wheels of equal diameters, which mesh into each other. In front of the main shaft and parallel with it are arranged a compound die and female cutter and a compound male cutter and "former," Fig. 4. This compound male cutter and former consists of three principal parts—a central cutter and punch, 1, a surrounding former, 2, and an external surrounding cutter, 3. The compound die and cutter consists of a female cutter, 4, a die, 5, and a second female cutter, 6. The office which each performs will presently appear.

Suppose, now, the machine to be in operation. By tracing the successive steps taken to form an eyelet the motions and functions of the several parts of the machine will be readily understood. The strip of stock having been carried by the feed-rollers far enough to cover the first opening 4 in the die, the cam D, acting upon the lever H, which has its fulcrum at H′, moves forward the sleeve I, with which it is connected by the pin *e*. This sleeve has an end bearing against the flanch *f* of the male cutter 3, and consequently carries it against the strip of metal, and continuing on acts, in combination with the female cutter 4, to cut out a planchet. As soon as this is done the cam E commences to act on the lever J, which is pivoted at J′, and moves forward the spindle K. This movement causes the "former" 2, with the punch 1, which is sheathed within it, to act against the planchet, and continuing on shapes the same, in combination with the die 5, into the form of a cup or capsule. While this is being done the cam D has completed its action, when the lever H, acted upon by the spring L, carries the sleeve I and the cutter 3 back to its first position. While the "former" 2 is acting to shape the metal in the die 5 the punch 1, which projects beyond it, forces the capsule into a deeper recess in the die at the bottom of which is the female die 6, through which the end of the punch passes and cuts out the top of the capsule. The eyelet is now formed into the proper shape, a flanch being turned upon its edge by the action of the end of the "former" 2, in combination with the interior die, at the same time that the punch 1 forces the capsule into the recess and cuts out the closed end. The cam E now permits the "former" 2 with the eyelet upon it, from the action of the spring *m*, to fly back within the cutter 3 as a sheath, whereby the eyelet is instantly stripped off. At the same instant that the "former" is withdrawn the wheel C on the main shaft, Fig. 3, which has a portion of its surface *o* cut away, permits the shield N, which rides upon it, to fall and cover the mouth of the die in order to prevent the eyelet, which is stripped from the "former" 2 with violence, from being shot into the cavity of the die. As the cam-shaft continues to revolve the shield is raised, the feeding-rollers bring forward another space the strip of metallic stock, and all the preceding operations are repeated.

The machinery above described is adequate to perform all the operations necessary for the manufacture of finished eyelets from a flat strip or ribbon of metal without intervening manipulation.

What I claim as my invention, and desire to secure by Letters Patent, is—

1. The combination of a punch, 1, a "former" or male mold, 2, a cutter, 3, a female cutter, 4, a die or female mold, 5, and a female cutter, 6, substantially as described, for the purposes specified.

2. I also claim the combination of suitable feeding devices *a a* with the devices 1, 2, 3, 4, 5, and 6, for forming eyelets from a metal strip, substantially as described.

3. A compound male cutter, 3, former 2, and punch 1, in combination, as described, for the purposes specified, constituting together the moving instruments in the formation of an eyelet.

4. A compound female cutter, 4, "former" 5, and female cutter 6, in combination, as described, for the purposes specified, constituting together the stationary instruments in the formation of an eyelet.

5. I also claim, in combination with the stationary instruments above mentioned, wherein the eyelet is formed, a shield, N, applied and operated in the manner substantially as described.

JESSE F. RICHARDS.

Witnesses:
J. ERASTUS LESTER,
JAS. C. LESTER.